Figure 4:
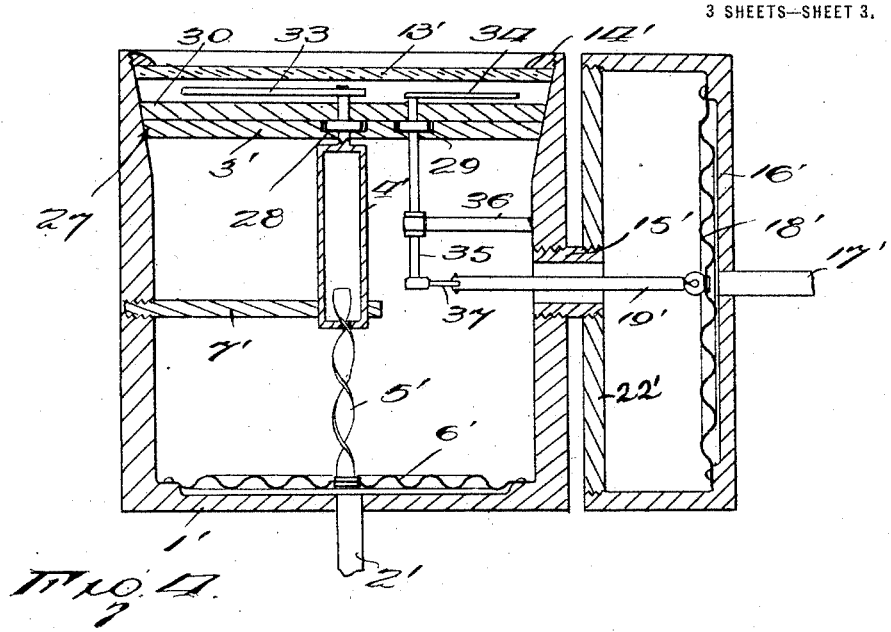

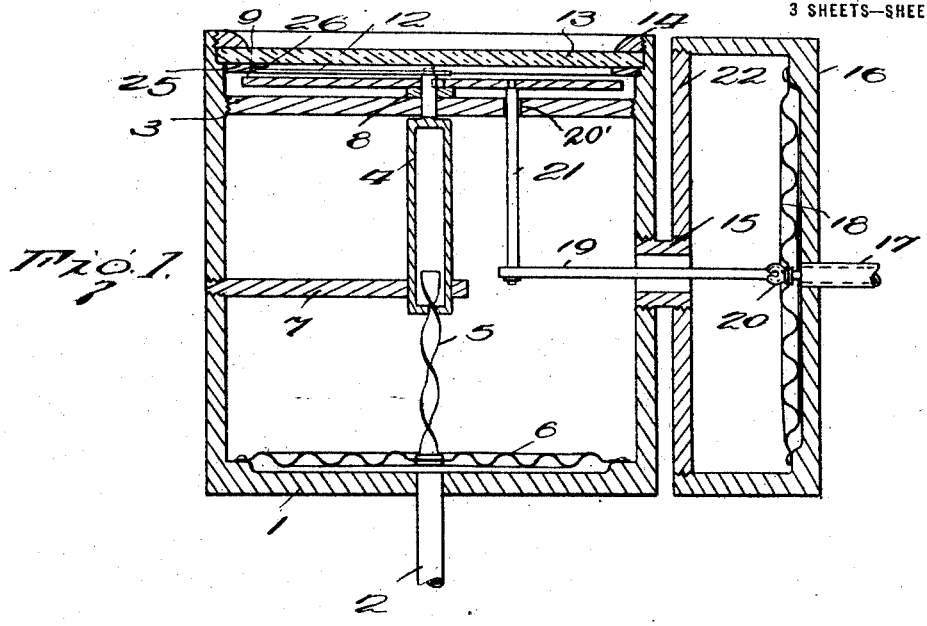
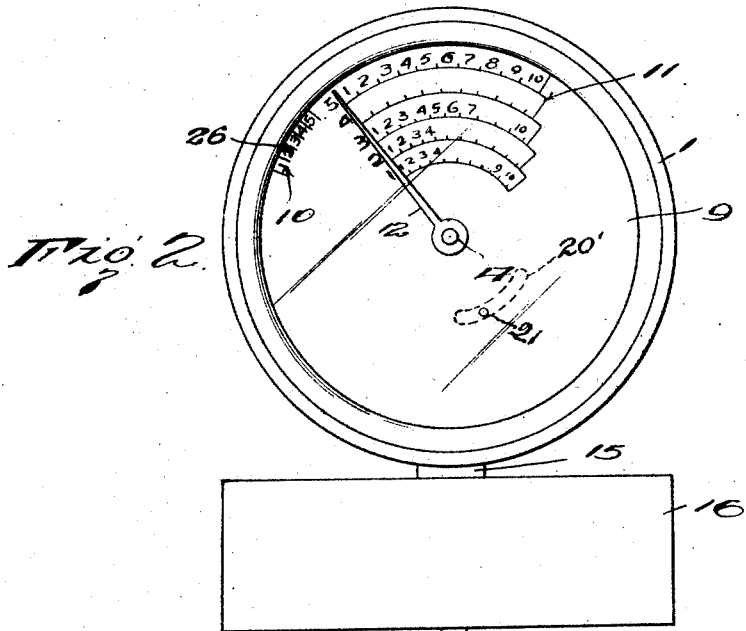

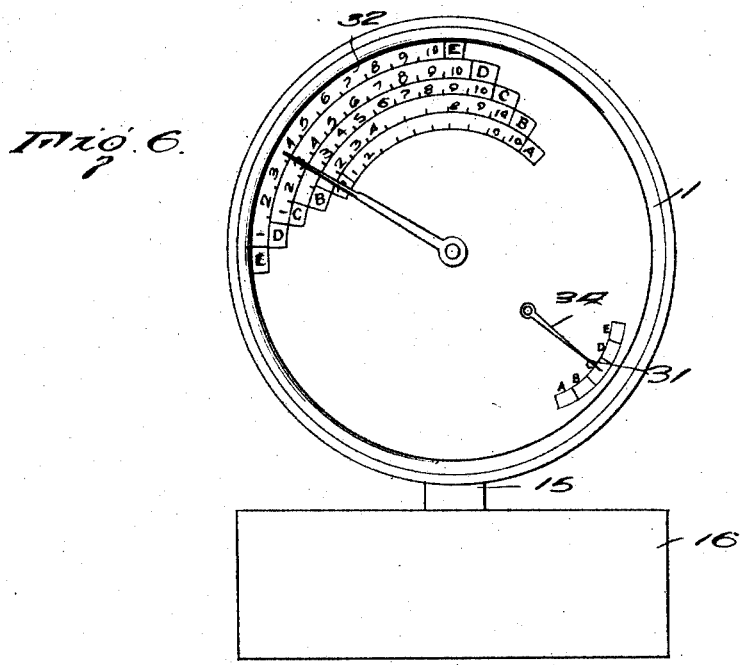
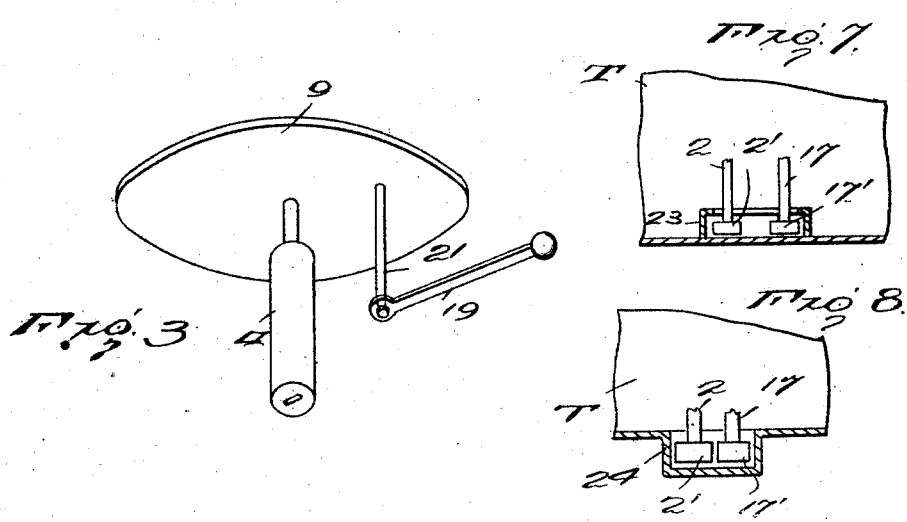

W. RICHTER.
PRESSURE GAUGE.
APPLICATION FILED FEB. 14, 1919.

1,415,710.

Patented May 9, 1922.
3 SHEETS—SHEET 3.

Willy Richter
Inventor

By Geo. P. Kimmel
Attorney

UNITED STATES PATENT OFFICE.

WILLY RICHTER, OF OLMSTED, ILLINOIS.

PRESSURE GAUGE.

1,415,710. Specification of Letters Patent. Patented May 9, 1922.

Application filed February 14, 1919. Serial No. 277,015.

*To all whom it may concern:*

Be it known that I, WILLY RICHTER, a citizen of the United States, residing at Olmsted, in the county of Pulaski and State of Illinois, have invented certain new and useful Improvements in a Pressure Gauge, of which the following is a specification.

This invention relates to improvements in liquid gauges and it is the principal object of the invention to provide a novel form of pressure gauge designed to accurately indicate the quantity of liquid in a tank or other container whereby to enable a user to conveniently ascertain the supply or quantity on hand.

Another and equally important object of the invention is to provide a form of gauge having registering means such as to allow for variances in the pressure means; the air contained in the communication conduit and forced by the tank liquid to expand the indicator diaphragm according to its temperature, so that a certain volume of air will exert a different amount of pressure at different times, or after the air has become sealed by tank liquid and is forced into indicator it either expands or contracts owing to the atmospheric changes; or the tank liquid might be placed under certain varying pressure either due to the atmospheric changes or other causes, all of which will cause the indicator not provided with this pressure regulator to register inaccurately.

It is also an object of the invention to provide the gauge with means for effecting the registering of the atmospheric pressure under which the vibrations of the pressure means or means of pressure provided with the gauge are replaced, such registration occurring, of course, on the dial of a gauge, and serving in the nature of a key whereby reference to corresponding graduations serving in conjunction with the first registering means and pertaining to the liquid contents of the tank can be had.

Other objects will be in part obvious and in part pointed out hereinafter.

In order that the invention and the manner of its application may be readily understood by those skilled in the art, I have in the accompanying illustrative drawings and in the detailed following description based thereon set forth several preferred embodiments of the invention.

In the drawings:—

Figure 5:
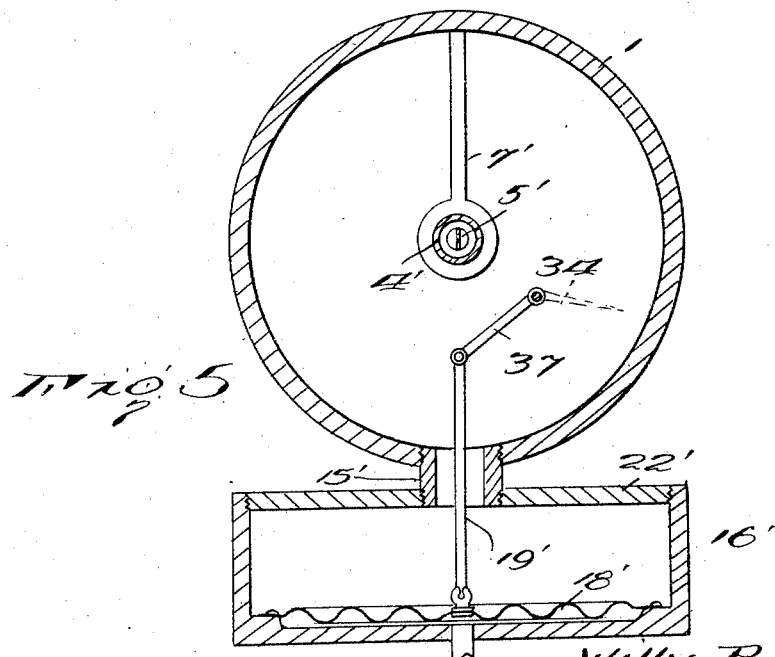

Figure 1 is a vertical section through the improved gauge,

Figure 2 is a top plan view thereof showing the manner in which the dial of a gauge is graduated to permit the registering of the atmospheric pressure under which the variations of the means of pressure is placed and to permit the registering of the quantity of the liquid contents of the tank, Figure 3 is a detail in perspective showing the connection of the atmospheric pressure indicating means with the dial of the gauge, Figure 4 is a vertical section through a slightly modified form of gauge, Figure 5 is a horizontal section therethrough, Figure 6 is a top plan view of the modified form of gauge, Figure 7 is a fragmentary detail partly in section showing the connection of the pressure conveying conduits with the liquid containing tank, and Figure 8 is a similar view of a slightly modified form of connection of the pressure conveying conduits with the liquid containing tank.

Having more particular reference to the drawings, in connection with which like reference characters will designate corresponding parts throughout the several views, 1 represents the casing proper of the gauge which has an inlet conduit 2 tapped into the bottom thereof while a screw-threaded opening is formed in one side of the same for a purpose which will be hereinafter apparent. The upper portion of the casing 1 which is circular in shape receives a closure plate 3 therein corresponding thereto in shape, said plate having a centrally located bearing opening therein for receiving the spindle portion of a motion transmitting connection 4, the lower portion of this connection being hollow and formed with a substantially rectangular slot for receiving the spiral standard 5 therein, which standard, as will be noted, is secured to the central portion of a flexible diaphragm 6 mounted adjacent the bottom of the casing 1 in a position to be operated by the pressure conveyed to the casing through the medium of the inlet conduit 2; the lower portion of the element 4 being suitably supported by a bracket arm 7 secured in any suitable manner to one side wall of the casing 1. Loosely mounted on the reduced bearing portion of the connection 4 is a washer 8 which rests against the closure plate 3 and receiving thereon in turn a rotatable dial 9 having sets of graduations indicated by the reference characters 10 and 11 presented on the upper face thereof. An indicator hand 12 is fixedly secured to the reduced upper portion of the connection 4 and as will be understood, is adapted to move over the dial 9 cooperating with the set of graduations 11, the purpose of which will be hereinafter more fully described. A suitable form of crystal 13 is arranged in the mouth of the casing 1 resting on an annular shoulder formed therein and being secured in position with respect to said casing by means of a locking ring 14 screw-threaded and turned into engagement with a corresponding portion of the casing.

Connected to one side of the casing 1 of the gauge through the medium of a sleeve or union 15 is a secondary casing 16 provided with an inlet conduit 17 and having a flexible diaphragm 18 arranged therein adjacent the end of said casing receiving the inlet conduit 17. Centrally located on the diaphragm 18 is a socket which serves to engage a spherical-like element arranged on the adjacent end of a connecting rod 19, thereby providing the usual form of ball and socket connection indicated at 20; the free or remaining end of the rod 19 being loosely engaged with the lower end of an arm 21 rigidly secured to and depending from the dial 9. In this connection, it of course will be understood that the closure plate 3 is formed with an arcuate slot 20' for receiving the arm 21 therethrough and permitting movement of the same under influence of the pressure operated diaphragm 18, while the connection of said arm 21 with the dial 9 is eccentric to the axis of movement of the latter on the bearing portion of the connection 4 as clearly illustrated in the Figure 1.

If desired, the secondary casing 16 can be provided with a removable form of side wall such as shown in the Figure 1 and indicated by the numeral 22, thus allowing access to the interior thereof for repairing, replacing or adjusting the diaphragm 18, such as conditions or preference may dictate.

The remaining ends of the pressure conveying conduits 2 and 17 are extended into the liquid containing tank T Figures 7 and 8 provided with the improved gauge downwardly to a point adjacent the bottom thereof whereat said tank is formed with a type of guard or baffle wall 23, which wall by reason of its arrangement about the enlarged ends 2' and 17' of said pressure conveying conduits will serve to prevent the slushing of liquid in the tank T from effecting proper functioning of the conduits. In this connection, it may be here noted that instead of forming the guard or baffle wall 23 in the lower portion of the tank T, I can if I so desire, form a depression 24 in the bottom of the tank, arranging the enlarged ends 2' and 17' of the pressure conveying conduits therein as shown in the Figure 8. This, of course, is optional.

Carried on a ring 25 engaged with the screw-threaded upper portion of the casing 1 and arranged below the crystal 13 is an indicator hand 26, which, as shown in the Figure 2 cooperates with the set of graduations 10. This set of graduations 10 serves to indicate the atmospheric pressure under which the liquid in the tank T is placed, as well as the other change of pressure means, it of course being understood that the pressure on the body of liquid in said tank varies by expansion and contraction due to its subjection to atmospherical conditions. Thus, should the air in both the conduits 2 and 17 be compressed by the tank liquid, the two diaphragms 6 and 18 would be properly expanded and the smaller pointer or hand would indicate which line of graduations 11 should be read so that in case one gallon of oil was added to the tank and the pointer 26 would point to 3, the zone 3 of the graduations 11 would indicate one gallon by the hand 12. Now when the pressure indicating means is actuated, the diaphragm 6 would in consequence be flexed the same as if oil had been added to the tank, and the diaphragm 18 would be expanded also and rod 19 would actuate the arm 21 and cause movement of the dial 9 in the same direction as the indicator hand 26. The pointer or hand 26 might now be opposite the numeral 2 of the graduations 10 and a consulting of the zone 2 of the graduations 11 would show one gallon. Without this arrangement, the indicator hand pointing at one gallon at a certain atmospheric condition, might point at four gallons if warm weather had expanded the air operating diaphragm and consequently, would register wrong. It is seen that the improvement overcomes this change of pressure as well as other changes and that if the hand is moved forward by air expansion, the dial is moved forwardly also and the number opposite the pointer 26 would indicate which line or zone to read on the graduations 11. The set of graduations 11 is, as stated, readable in conjunction with the set of graduations 10, the latter serving in the nature of a key; it being noted that said graduations 10 includes numerals from 1 to 5 while the graduations 11 are arranged in arcuate zones numbered 1, 2, 3, 4 and 5 respectively corresponding to the graduations 10. Thus, as an illustration, if the graduation 2 as shown in the Figure 2 of the drawings were aligned with the indicator hand 26, reference would be then had to the graduations contained in the zone identified by the numeral 2 of the set 11 and upon movement of the indicator 12 by changes in the depth of the liquid in tank T over said zone, the user of the gauge would be enabled to accurately ascertain the liquid contents of the tank T. Should the pressure vary by a change in the depth of the liquid, then of course the dial 9 would be further rotated to cause the aligning of certain of the graduations 10 with the indicator hand 26 whereupon the graduations 11 would be read in accordance with the particular key given by the graduations 10.

It of course will be understood that the indicator 12 is operated by the changes in the depth of liquid in conduit 2 in the tank T due to the rise and fall of the liquid level in the tank T, the flexing of the diaphragm 6 causing raising and lowering of the spiral standard 5 which by reason of its connection with the motion transmitting element 4 will effect rotation of the indicator 12 over the arcuate sets of graduations 11.

The most important reason for providing the tank with the depression is the fact that it requires a certain amount of pressure by tank liquid against the air contained in the conduit to properly charge the gauge with air pressure before it can be used to register the contents of the tank. Consequently, if the liquid contained in the depression will displace the air contained in the conduit ends 2 and 17 and this amount is sufficient to properly charge the balancing device, then as soon as any liquid was filled in the main tank, the recording hand would indicate the smallest possible amount. If the balancing device would be properly charged the diaphragms 6 and 18 would be continually under pressure regardless of how much the air or pressure means might contract and the indicating means should at all times register any expansion of the air or means of pressure in order to enable the gauge to always register correctly. Of course, both diaphragms 6 and 18 must necessarily respond to a change in pressure in conformity to the graduations so that before any liquid is added to main tank T but only enough to fill depression 24, pointer 26 (Figure 2) will operate over the set of graduations 10 changing accordingly to the changes in temperature, while hand 12 will be exactly positioned at zero.

In the Figures 4, 5 and 6 I have illustrated a slightly modified form of gauge, which in this particular embodiment includes a main casing 1', which main casing has the inner walls of the upper portion thereof beveled as at 27 whereby to receive a closure plate 3' formed with a centrally located bearing opening 28 and an eccentrically located bearing opening 29, over which plate a circular dial 30 having different sets of graduations 31 and 32 arranged on the face thereof is positioned, this dial of course having openings formed therein corresponding to the bearing openings 28 and 29. An indicator hand 33 is carried on the reduced portion of the motion transmitting connection 4', which connection has its lower portion supported on a bracket arm 7' arranged in and secured to one side wall of the casing 1' while a spiral standard 5' is engaged with said lower portion and is fixedly mounted on the central portion of the diaphragm 6' arranged adjacent the bottom of the casing 1' and communicating with the pressure conveying conduit 2'. This indicator 33 is adapted to cooperate with the sets of graduations 32, which as will be noted include arcuate zones identified by the letters A to E inclusive. A second indicator hand 34 is carried on the upper end of a shaft 35 passing through the aligned openings in the closure 3' and the dial 30 and extending downwardly into the casing whereat it is rotatably supported upon a bracket arm 36 arranged in and secured to one side of the casing 1'; the lowermost end of said shaft 35 carrying a form of crank arm 37, the purpose of which will be presently described.

The usual crystal 13' is arranged in the mouth of the casing 1' and is locked in position through the medium of a ring 14' screw threaded and turned into engagement with a corresponding portion of said casing. It may be here mentioned, that the indicator hand 34 cooperates with the set of graduations indicated by the reference numeral 31 and including the letters A to E inclusive.

Connected to one side of the casing 1' and communicating therewith through the medium of a union or sleeve 15' is the casing 16' having a diaphragm 18' arranged therein which diaphragm is adapted to be astuated by pressure delivered into the secondary casing through the medium of a conduit 17'; a suitable type of socket being carried centrally of the diaphragm 18' and being engaged with the spherical-like end of a connecting rod 19' which in turn is pivoted to the free end of the crank arm 37 carried on the lowermost portion of the shaft 35. This secondary casing 16' may too be provided with a removable closure 22' whereby access may be had to the interior thereof.

In operation of the embodiment of the invention such as illustrated in the Figures 4, 5 and 6, the atmospherical pressure under which the liquid in the tank T communicating with the gauge is placed is conveyed through the medium of the conduit 17' to the secondary casing 16' whereupon it is discharged onto the flexible diaphragm 18' causing expansion of the same and the resultant rotation of the hand 34 through the medium of its connection with said diaphragm. The hand 34 will be aligned with certain of the graduations 31, which as stated in connection with the first embodiment of the invention, serves to give the key for the reading of the sets of graduations indicated by the numeral 32, the latter graduations being arranged in zones identified by the letters A to E inclusive corresponding to the letters A to E inclusive on the graduations 31. At the same time, the atmospheric pressure in the tank T will cause expansion or flexing of the diaphragm 6', and by reason of the connection of the diaphragm with the indicator hand 33 rotation will be imparted to the latter to cause its alignment with the graduations 32 arranged in the various zones of which the same is composed. As illustration, should the indicator 34 align with the graduation identified by the letter A in the indications 31, then the user to accurately ascertain the liquid contents of the tank provided with the gauge would refer to that zone of indications 32 identified by the letter A. Should the indicator 34 align with the letter E, or with any other of the letters of which the graduations 31 are provided, then corresponding reference would be had to the zones composing the graduations 32, giving as the result, the accurate liquid contents of the tank and compensating for the variance in the body of liquid by reason of its being affected by the atmospherical conditions, or other causes beyond control.

From the foregoing, it will be appreciated by persons skilled in the art that I have provided a comparatively simple form of pressure gauge which will be found especially useful in connection with the fuel tanks of motor driven vehicles, it being possible to arrange the gauge at a point convenient to the operator's seat whereby ready reference can be had thereto. Since the fuel tanks of motor driven vehicles are subjected to practically all variances in atmospherical conditions, it necessarily follows that a form of gauge which will compensate for these variances in atmospherical temperatures should be provided. In applicant's device, this requirement is satisfied.

That portion of the conduit 17 arranged in the tank and leading to the secondary diaphragm need be just large enough to convey the air contained in the enlarged end and displaced by liquid of tank. The enlarged end 2' of conduit 2 preferably is of such size as to charge the primary diaphragm with sufficient pressure so as to allow the hand to be either in line with graduations 11 (Figure 2) or to operate at graduations 32, (Figure 6) between A and E just at the time the air in the conduit 2' is displaced by the tank liquid.

Of course, both diaphragms of the indicator constructions, necessarily have to respond to pressure in uniformity to correspond to graduations.

It is obvious that various other means are now known to accomplish the registering of pressure without being confined to the particular arrangement described herein. This device may be used in connection with any tank gauge with but few minor changes, well within the scope of the invention.

Manifestly, the construction shown is capable of considerable modification and such modifications as are within the scope of my claims, I consider within the spirit of my invention.

I claim:

1. A pressure gauge for liquid containing tanks including a casing having a plurality of pressure inlet means, a dial having different sets of graduations in said casing, independent indicating means cooperating with the dial, motion transmitting means operable by the pressure introduced by said inlet means, one of said indicating means cooperating with graduations on the dial indicating the atmospherical pressure under which the means of pressure is placed, and the other indicating means cooperating with graduations corresponding and readable in conjunction with the first graduations for indicating the quantity of liquid in the tank.

2. A pressure gauge for liquid containing tanks including a primary casing, a secondary casing connected and communicating with said primary casing, each of said casings having independent pressure conveying means discharging thereinto, flexible diaphragms arranged in the primary and secondary casings operable by the pressure discharged thereinto, a dial having different sets of graduations within the primary casing independent indicating means cooperating with the dial, motion transmitting means operable by said diaphragms and connected to the indicating means, one of said indicating means cooperating with graduations on the dial to indicate the atmospherical pressure under which the means of pressure is placed, and the other indicating means cooperating with a second set of graduations on the dial corresponding to and readable in conjunction with the first graduations for indicating the exact quantity of liquid in the tank.

3. A pressure gauge including a primary casing, a secondary casing connected to and communicating with said primary casing, flexible diaphragms arranged in the primary and secondary casings, pressure conveying means discharging into the primary and secondary casings for actuating the diaphragms therein, a spiral standard carried by the diaphragm in the primary casing, a motion transmitting connection engaged with and rotatable by said standard, a dial arranged in the primary casing receiving the motion transmitting connection therethrough, an indicator carried by said motion transmitting connection, said dial being provided with separate sets of graduations, a crank connected to said second indicator and to the diaphragm in the secondary casing, said second indicator serving to indicate the atmospherical pressure under which the means of pressure is placed and said first indicator serving to indicate the exact liquid contents of the tank, the graduations cooperating therewith being readable in conjunction with the graduations cooperating with said second indicator.

4. In a pressure gauge for liquid containers, a dial, an indicator therefor, means cooperating with the indicator in response to the liquid introduced into the container to indicate on the dial, variations of atmospheric pressure to which the liquid contents in the tank is subjected, and pneumatically controlled means for indicating the quantity of the liquid so introduced.

5. In a pressure gauge for liquid containers, a rotatable dial, an indicator therefor, means controlled by the atmospheric pressure conditions in the tank for actuating the dial with respect to said indicator to show variations in such atmospheric pressure conditions, a second indicator, and means controlled by the pressure conditions of the atmosphere in the container for actuating said second indicator and indicating the quantity of liquid in the container.

6. In a pressure gauge for liquid containers, a rotatable dial, a stationary indicator therefor, a movable indicator oscillating about the rotation axis of the dial and cooperating with said dial, means controlled by the conditions of the container by actuating the dial with respect to said stationary indicator to indicate variations in said conditions, and other means for actuating the movable indicator to indicate the quantity of liquid in the container.

7. In a pressure gauge for liquid containers, a rotatable, dial, a stationary indicator therefor, a movable indicator oscillating about the rotation axis of the dial independently of the rotations of the dial, the dial having suitable graduations for cooperating with the movable indicator, means controlled by the atmospheric pressure in the container for actuating the dial with respect to said stationary indicator to indicate variations in said pressure, and means controlled by said pressure for actuating the movable indicator relatively to the dial to indicate the quantity of liquid in the container.

8. In a pressure gauge for liquid containers, a rotatable dial, a stationary indicator cooperating with graduations disposed adjacent the outer edge thereof, a movable indicator oscillating in front of the dial about the rotation axis of the dial, the face of the dial having suitable graduations for cooperating with said movable indicator, suitable diaphragms responding to the conditions of pressure in the container, intermediate connections between one of the diaphragms and the dial for imparting rotation to the dial to indicate variations of atmospheric pressure in the container, and intermediate connections between the second diaphragm and movable indicator for indicating the quantity of liquid in the container.

9. In a pressure gauge for liquid containers, a rotatable dial, a stationary indicator cooperating with marginal graduations disposed thereon, a series of concentric graduations disposed in arcuate form on the face of the dial, a movable indicator oscillating about the rotation axis of the dial and cooperating with said concentric graduations, diaphragms responding to the conditions of pressure in the container, intermediate connections between one of the diaphragms and the dial for imposing rotation to the dial to indicate the changes in pressure due to variations in atmospheric conditions to which the liquid in the container is subjected, and intermediate connections between the second diaphragm and movable indicator for indicating the quantity of liquid in the container, the reading on the marginal graduations indicating the particular arcuate graduation along which the reading should be taken in connection with the oscillating indicator.

In testimony whereof, I affix my signature hereto.

WILLY RICHTER.